United States Patent [19]

Merz

[11] Patent Number: 5,010,184

[45] Date of Patent: Apr. 23, 1991

[54] IONICALLY MODIFIED AGAROSE

[75] Inventor: Jürg Merz, Biel-Benken, Switzerland

[73] Assignee: Ciba-Geigy Corporation, Ardsley, N.Y.

[21] Appl. No.: 371,669

[22] Filed: Jun. 21, 1989

Related U.S. Application Data

[63] Continuation of Ser. No. 38,418, Apr. 10, 1987, abandoned, which is a continuation of Ser. No. 745,550, Jun. 17, 1985, abandoned.

[30] Foreign Application Priority Data

Jul. 6, 1984 [CH] Switzerland .......................... 3287/84

[51] Int. Cl.$^5$ ................................. C07H 5/04
[52] U.S. Cl. ..................................... 536/55.1; 536/1.1; 536/18.7; 536/53; 536/55
[58] Field of Search ................... 536/1.1, 18.7, 53, 55, 536/55.1

[56] References Cited

U.S. PATENT DOCUMENTS

| | | | |
|---|---|---|---|
| 4,060,506 | 11/1977 | Verbanac | 260/17.4 |
| 4,094,833 | 6/1978 | Johansson et al. | 536/112 |
| 4,133,929 | 1/1979 | Bones et al. | 428/260 |
| 4,178,438 | 12/1979 | Haase et al. | 536/31 |
| 4,263,146 | 4/1981 | Wegmuller et al. | 210/679 |
| 4,264,766 | 4/1981 | Fischer | 536/112 |
| 4,308,254 | 12/1981 | Tayot | 424/124 |
| 4,451,613 | 5/1984 | Rousseau et al. | 525/54.31 |

FOREIGN PATENT DOCUMENTS 733100 7/1955 United Kingdom .
1570591 7/1980 United Kingdom .
1570592 7/1980 United Kingdom .

OTHER PUBLICATIONS

CA abstract 62 8987e.
"Principles of Polymer Chemistry", Paul J. Flory, Cornell University Press, p. 83 and Cover page, (1953).
"Encyclopedia of Polymer Science and Technology" vol. 4, (1966), John Wiley & Sons, Inc., pp. 805-807, Cover and copyright pages.
European Search Report EP 85 81 0285.
J. Chem. Tech. Biotechnol., vol. 32, pp. 109-118 (1982).
E. A. Peterson: "Cellulosic Ion Exchangers", p. 253, (1980).

Primary Examiner—Johnnie R. Brown
Assistant Examiner—Elli Peselev
Attorney, Agent, or Firm—Kevin T. Mansfield; Edward McC. Roberts

[57] ABSTRACT

Novel ionically modified polysaccharides which contain α-glycosidic linkages, the ionic groups of which are attached to the polysaccharide component through the grouping of the formula

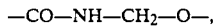

$$-CO-NH-CH_2-O-,$$

the carbonyl group being attached to the ionic group and the oxygen atom being attached to the polysaccharide component, are prepared by reacting the polysaccharides with compounds that contain N-methylolamide groups, and are used for treating effluents and, in particular, for separating mixtures of substances containing ionic components by chromatography.

7 Claims, No Drawings

IONICALLY MODIFIED AGAROSE

This application is a continuation of application Ser. No. 038,418, filed Apr. 10, 1987, abandoned, which is a continuation of application Ser. No. 745,550, filed June 17, 1985, abandoned.

The present invention relates to polysaccharides which have been modified by chemical means, i.e. cationically, amphoterically or anionically modified polysaccharides.

Cellulosic materials which have been modified anionically by chemical means, for example cationic, amphoteric or anionic cellulosic materials, which are used in particular for effluent purification, in particular for removing dyes from wastewaters, are known from German Offenlegungsschrift specification Nos. 2 650 988, 2 727 755 and 2 925 689. The known ionically modified cellulosic materials are polysaccharides which contain β-glycosidic linkages.

It has now been found that novel ionically modified polysaccharides which contain α-glycosidic linkages have unexpected properties that make it possible to use them, inter alia, as stationary phase in the chromatographic separation of mixtures of substances that carry an anionic charge.

Accordingly, the present invention relates to chemically modified polysaccharides which contain α-glycosidic linkages and ionic groups which are linked through the grouping $$-CO-NH-CH_2-O- \quad (1)$$

to the polysaccharide component, with the carbonyl group being attached to the ionic group and the oxygen atom being attached to the polysaccharide component.

Further objects of the present invention are a process for the preparation of the ionically modified polysaccharides, the use thereof for separating mixtures of substances, and chromatographic methods of separation in which said material is employed.

Representatives of polysaccharides which contain α-glycosidic linkages are in particular starch and derivatives thereof, for example dextran and the dextrins, in particular white dextrin. Also suitable are polysaccharides which do not exclusively contain α-glycosidic linkages, for example agarose, which consists of alternating D-galactopyranose units linked by β-1,3 bonds and 3,6-anhydro-L-galactopyranose units linked by β-1,4 bonds. The polysaccharides of this invention may be completely or partially crosslinked. Uncrosslinked dextrins, uncrosslinked or crosslinked dextran or uncrosslinked or crosslinked agarose, which are anionically modified and contain α-glycosidic linkages, are of particular interest.

The ionic groups (substituents) of the modified polysaccharides of this invention, which are attached through the carbonyl group of the grouping of the formula (1) to the polysaccharide, are in the form of anionic, preferably amphoteric and, most preferably, cationic groups.

Such groups, if they are cationic, contain basic substituents, for example quaternary guanidinium, immonium or, preferably, ammonium groups. Particularly interesting groups are cationic groups which preferably contain substituted ammonium groups, with two such ammonium groups or, preferably, one such group, normally being present.

Suitable N-substituents are aliphatic, cycloaliphatic, aromatic and araliphatic groups which, together with the nitrogen atom and any further hetero atoms, may preferably form 5-membered and, in particular, 6-membered rings. Particularly suitable N-substituents are straight chain or branched lower alkyl radicals which may be substituted by hydroxy, nitrile, halogen or lower alkoxy.

The basic radicals of preferred cationic groups of the modified polysaccharides of this invention accordingly have for example the formula

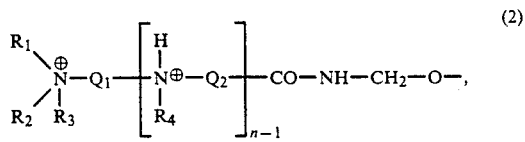

wherein n is 1 or 2, each of $R_1$, $R_2$, $R_3$ and $R_4$ independently is hydrogen, straight chain or branched $C_1-C_4$alkyl which is unsubstituted or substituted by hydroxy, nitrile, halogen or $C_1-C_4$alkoxy, or is cycloalkyl or $C_1-C_4$alkyl-substituted cycloalkyl, benzyl or phenyl, each unsubstituted or substituted by nitro or halogen, or $R_1$ and $R_2$, together with the nitrogen atom to which they are attached and any further hetero atoms, form a 5- or 6-membered heterocyclic ring, or $R_3$ and $R_4$, together with the grouping

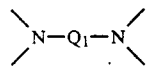

to which they are attached, and any further hetero atoms, also form a 5- or 6-membered heterocyclic ring, and each of $Q_1$ and $Q_2$ independently is $C_1-C_8$alkylene.

Preferred aliphatic N-substituents are unbranched or branched lower alkyl radicals which are unsubstituted or substituted by nitrile, preferably by hydroxy or chlorine as halogen. Suitable cycloaliphatic N-substituents are, for example, cyclopentyl and, preferably, cyclohexyl, each unsubstituted or substituted by lower alkyl. Preferred araliphatic and aromatic substituents are benzyl or phenyl which are substituted by halogen, for example chlorine, or, most preferably, are unsubstituted benzyl or phenyl. The heterocyclic rings which may be formed together with the nitrogen atom of an ammonium group or with the two nitrogen atoms of two ammonium groups and any further hetero atoms, preferably further nitrogen and/or oxygen atoms, are preferably for example pyrrolidinium, piperidinium, morpholinium, imidazolinium, benzimidazolinium rings, is particular piperazinium and, most preferably, triazinium rings, which are unsubstituted or substituted by halogen, for example chlorine. The ammonium group is attached to the carbonyl group of the grouping of the formula (1) preferably through an isopropylene group, in particular an n-propylene group, preferably an ethylene group. The same also applies to the linkage between two ammonium groups, where two ammonium groups are present.

Accordingly, preferred cationically modified polysaccharides of the present invention contain basic radicals of the formula

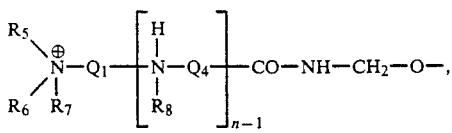

wherein n is 1 or 2, each of $R_5$, $R_6$, $R_7$ and $R_8$ independently is hydrogen, alkyl, hydroxyalkyl, cyanoalkyl or chloroalkyl, each of 1 to 4 carbon atoms, cyclopentyl or cyclohexyl, each unsubstituted or substituted by $C_1$-$C_4$alkyl, unsubstituted benzyl, chlorobenzyl, unsubstituted phenyl, nitrophenyl or chlorophenyl, or $R_5$ and $R_6$, together with the nitrogen atom to which they are attached and optionally an oxygen atom, form a pyrrolidinium, piperidinium or morpholinium ring, or $R_7$ and $R_8$, together with the grouping

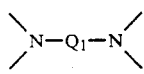

to which they are attached, and any further hetero atoms, form an imidazolinium, benzimidazolinium, piperazinium or triazinium ring, or a mono- or dichlorotriazinium ring, and each of $Q_3$ and $Q_4$ independently of the other is $C_2$-$C_3$alkylene.

Particularly interesting cationicaly modified polysaccharides are those whose basic radicals contain a single ammonium group which is attached to the carbonyl group of the grouping of formula (1) through an ethyl group and which contain, as N-substituents, two unsubstituted lower alkyl radicals or a hydroxyl-substituted tert-butyl radical.

Such modified polysaccharides contain, in particular, basic radicals of the formula

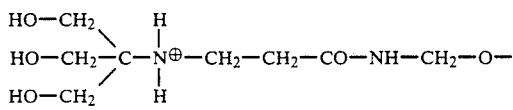

or

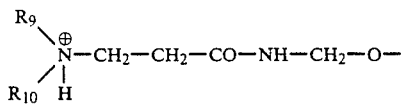

wherein $R_9$ and $R_{10}$ are different from each other or are preferably identical and are each isopropyl or, preferably, n-propyl, ethyl or methyl.

If the ionically modified polysaccharides of this invention contain amphoteric groups which are attached at the carbonyl group of the grouping of the formula (1), then said amphoteric groups normally carry zwitterionic amino acid groups, for example aminoacetic acid (glycine) groups, iminodiacetic acid groups, methylaminoacetic acid (sarcosine) groups, methylaminopropionic acid groups, iminodipropionic acid groups, iminoacetic acid-propionic acid groups, aspartic acid groups, ethanolaminoacetic acid groups, vinylbenzyliminodiacetic acid groups or ethylenediamine-N,N'-dipropionic acid groups.

These amino acid groups, for example those of the kind specified above, are attached at the carbonyl group to the grouping of the formula (1), preferably through an alkyl-substituted, phenyl-substituted or unsubstituted alkylene or phenylene chain and, if present, in addition through an oxygen or nitrogen atom or a secondary or alkyl-substituted tertiary amino group.

The zwitterionic radicals of preferred amphoteric groups of the modified polysaccharides of this invention thus correspond for example to the formula

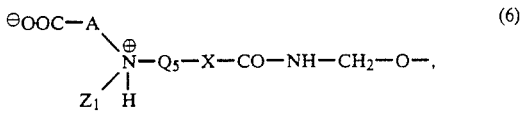

wherein X is $-O-$, $-S-$,

or a direct bond, $R_{11}$ is hydrogen or $C_1$-$C_4$alkyl, $Q_5$ is a $C_1$-$C_8$alkylene or phenylene radical, each of which is unsubstituted or substituted by $C_1$-$C_4$alkyl or phenyl, $Z_1$ is $-B-COO^{\ominus}$, $C_1$-$C_4$alkyl or hydrogen, and A and B are each independently of the other a $C_1$-$C_8$alkylene radical which is unsubstituted or substituted by $C_1$-$C_4$alkyl, $C_1$-$C_4$alkoxy or phenyl.

Preferably, X in formula (6) is a direct bond and $Z_1$ is lower alkyl, preferably methyl or ethyl, or is hydrogen. A preferred definition of $Q_5$ is in particular unsubstituted lower alkylene.

Accordingly, particularly interesting amphoterically modified polysaccharides are those which contain radicals of the formula

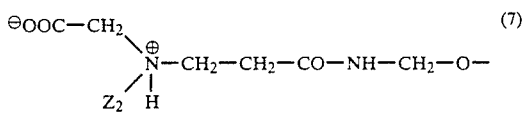

wherein $Z_2$ is methyl or hydrogen.

Where the modified polysaccharides of the present invention contain anionic groups which are attached at the carbonyl group of the grouping of the formula (1), such anionic groups generally carry a carboxyl group or acid radicals of a polybasic inorganic oxygen-containing acid, for example the radical of a sulfuric acid ester or phosphoric acid ester, a phosphonic or phosphoric acid radical, the radical of a phosphoric acid hemiester, or a sulfonic acid radical.

Such acid radicals are attached as a rule direct at the carbonyl group of the grouping of the formula (1), preferably through an alkyl-substituted or unsubstituted alkylene or phenylene chain.

The acid radicals of preferred anionic groups of the modified polysaccharides of the present invention thus correspond for example to the formula

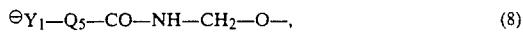

wherein $Y_1^{\ominus}$ is carboxyl or the acid radical of a polybasic inorganic oxygen-containing acid, and $Q_5$ is as defined above, with preferred acid radicals being those of the formula

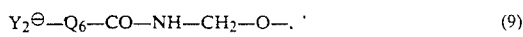

wherein $Q_6$ is isopropylene, n-propylene, preferably ethylene or methylene, and $Y_2^\ominus$ is $-COO^\ominus$, $-SO_3^\ominus$, or

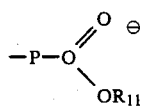

and $R_{11}$ is as defined above.

The ionically modified polysaccharides of this invention normally have a degree of substitution of about 0.1 to about 0.8, preferably of 0.2 to 0.6. The degree of substitution is determined on the basis of the nitrogen content of the modified polysaccharide.

The procedure for obtaining the ionically modified polysaccharides of the present invention is generally such that a polysaccharide of the indicated kind is reacted, as starting material, in a manner known per se, with a compound which contains an N-methylolamide group. The N-methylol compound employed will be for example a compound of the formula

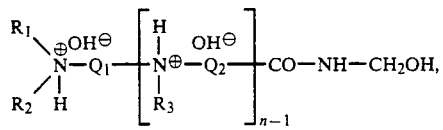 (10)

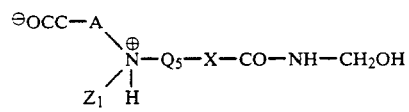 (11)

or $H^\ominus \oplus Y_1 - Q_5 - CO - NH - CH_2OH$ (12)

wherein A, $Q_1$, $Q_2$, $Q_5$, $R_1$, $R_2$, $R_3$, $R_4$, X, $Y_1^\ominus$, $Z_1$ and n have the given meanings.

The compounds of formula (10) are disclosed in German Offenlegungsschrift specification Nos. 2 650 966 and 1 650 999, the compounds of formula (11) in German Offenlegungsschrift No. 2 727 755, and the compounds of formula (12) in German Offenlegungsschrift No. 2 925 689. The preparation of the compounds of formulae (10), (11) and (12) is also described in the above mentioned specifications.

In a further embodiment of the process for the preparation of the ionically modified polysaccharides of this invention, where $Q_2$ in formula (2), $Q_4$ in formula (3) and $Q_5$ in formula (6) are each ethylene and X in formula (6) is a direct bond, the polysaccharide of the indicated kind is reacted first with methylolacrylamide as methylol compound (prepared from acrylamide and formaldehyde or a formaldehyde donor, for example paraformaldehyde, hexamethylenetetramine or trioxane, at a maximum temperature of 100° C., preferably in the range from 20° to 60° C., in aqueous medium and, if desired, in the presence of a basic catalyst, for example sodium hydroxide, sodium methylate or magnesium oxide), and subsequently the ionic group is introduced by addition to the double bond of the intermediate, which contains acrylic-modified non-ionic groups of the formula $-O-CH_2-NH-CO-CH=CH_2$ (13)

which are attached to the polysaccharide component, of a cationic compound of the formula

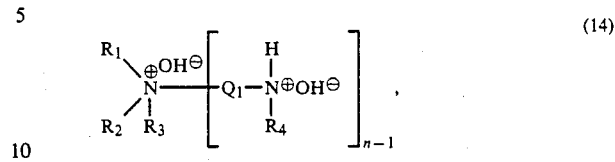 (14)

wherein n, $R_1$, $R_2$, $R_3$, $R_4$ and $Q_1$ are as defined above, of an amphoteric compound of the formula $^\ominus OOC-A-^\oplus NH_2-Z_1,$ (15)

wherein A and $Z_1$ are as defined above, or of an anionic compound of the formula $Y_1^\ominus H^\oplus$ (16)

wherein $Y_1^\ominus$ is as defined above.

Representative preferred compounds of formula (4) are for example: aminotriazine, aminodichlorotriazine, imidazole, benzimidazole, piperidine, chloroaniline, aniline and, in particular, diethylamine, diethanolamine and tris(hydroxymethyl)aminomethane. Preferred compounds of formula (15) are aminoacetic acid and sarcosine. A preferred compound of formula (16) is sodium pyrosulfite.

The polysaccharide of the indicated kind and a methylol compound of the formula (10), (11) or (12) are preferably stirred for about 20 to 40 minutes, in aqueous medium, at pH 3 to 6 and at 15° to 25° C., then dried at 70° to 80° C., and finally the product is subjected to a heat treatment for 1 to 2 hours at 90° to 150° C., preferably at 90° to 100° C. In a further preferred embodiment of the preparatory process, the cellulose powder and methylolycrylamide, as methylol compound, are stirred for about 20 to 40 minutes, in aqueous medium, at pH 3 to 6 and at 15° to 50° C., preferably in the presence of a polymerisation inhibitor such as hydroquinone, then dried at 70° to 80° C., and the product is thereafter subjected to a heat treatment for 1 to 2 hours at 90° to 150° C., preferably at 90° to 100° C., and, in a final step, the ionic group is introduced by addition to the double bond of the acrylic-modified intermediate of a compound of the formula (14), (15) or (16), in aqueous medium, at pH 7.0 to 12.5, preferably at pH 11.0 to 12.0, and at 15° to 50° C., over about 4 to 6 hours, and finally the ionically modified polysaccharide is dried at 70° to 80° C. In both variants of the process, it is advantageous to store the polysaccharide impregnated with the methylol compound at 15° to 25° C. for at least 24 hours (cold storage process) before the drying step at 70° to 80° C.

The ionically modified polysaccharides of the present invention are used for purifying effluents as described for example in German Offenlegungsschrift No. 2 650 988, in which ionically modified cellulosic materials are employed, and especially for separating mixtures of substances which contain at least an amount of ionic components. The per se known chromatographic method of separating such substances comprises using the ionically modified polysaccharides of this invention, which have ion exchange properties, as stationary phase.

In particular, mixtures of organic substances of any composition can be separated into their components, provided at least one of the components of said mixtures of substances carries a cationic, anionic or amphoteric charge. Typical examples of possible mixtures of substances comprise technical mixtures of dyes, pharmaceuticals (enrichment or purification of fermentation broths) and lignin derivatives. In particular, the mixtures of amino acids present for example in compositions of cephalosporin C-sodium salts can be separated by ion exchange chromatography using the ionically modified polysaccharides of this invention as stationary phase. Apparatus and a chromatographic method of separating cephalosporin C-sodium salts with macroporous ion exchangers, for example AMBERLIT® XAD, which can also be employed for the chromatographic separation of cephalosporin C-sodium salts with the ionically modified polysaccharides of the present invention, is described for example by W. Voser in the article entitled "Isolation of Hydrophobic" "Fermentation Products by Adsorption Chromatography" in J. Chem. Techn. Biotechnology, Vol. 32, pp. 109–118 (1982).

A particularly interesting utility of the ionically modified polysaccharides of the present invention is the chromatographic separation of lignoamines or of lignosulfonates present in black liquors of wood pulp for paper manufacture (Kraft process) or in sulfite lyes of wood pulp (sulfite process). By isolating the components of the lignoamine or lignosulfonate mixtures, it is possible to obtain, inter alia, valuable dispersants and products derived from polysaccharides. Such mixtures of lignosulfonates are commercially available under registered trademarks such as ATTISOL® I und II, MARASPERSE®, DYNASPERSE®, LIGNOSOL® DlO, BORRESPERSE® N, POLYFON® O und H und REAX® 80L, 81A, 82, 83A, 85A and 88B. Commercially available mixtures of lignoamines are also obtainable e.g. under the registered trademarks IONDULIN® Wl and MQK.

The most important advantage of the ionically modified polysaccharides of the present invention is that, on account of their good separating properties and their good flow properties, they can be readily used as stationary phase in chromatographic methods of separation, in which connection the entire pH range from about 1 to 14 can be utilised employing both alkaline and acid eluants.

In the following Preparatory Methods and subsequent Examples, parts and percentages are by weight.

PREPARATORY METHODS

Method A 264.6 parts of diethylamine (3.6 moles) and 0.9 part of a 30% aqueous solution of sodium hydroxide are warmed to 35° C. To the diethylamine solution is then added a solution of 256 parts (3.6 moles) of acrylamide and 0.025 part of hydroquinone in 270 parts of water over 4 hours, while keeping the reaction mixture at 40° C. with cooling. When the addition of acrylamide is complete, the reaction mixture is heated to 55° C., kept at this temperature for 15 hours, then cooled to 20° C. and adjusted to pH 9.4 with 30 parts of a 37% aqueous solution of hydrochloric acid. Then 352 parts (4.34 moles) of a 37% aqueous solution of formaldehyde are added to the reaction mixture, which is subsequently kept for 24 hours at 20° C. Yield: 1173.5 parts of a 50% aqueous, slightly viscous brownish solution of the reaction product of the formula

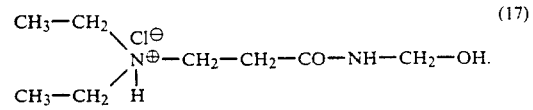

Method B 391.4 parts (1.9 moles) of sodium pyrosulfite are dissolved in 500 ml of water and the solution is warmed to 35° C. To this solution are added 256 parts (3.6 moles) of acrylamide and 0.025 part of hydroquinone in 270 parts of water over 4 hours, while keeping the pH of the reaction solution at 12.0 by addition of a 30% aqueous solution of sodium hydroxide and while maintaining the temperature of the reaction solution at 40° C. by cooling. When the addition of acrylamide is complete, the reaction mixture is heated to 55° C., kept at this temperature for 15 hours, then cooled to 20° C. and adjusted to pH 9.5 with a 37% aqueous solution of hydrochloric acid. To the reaction mixture are then added 130 parts (4.33 moles) of paraformaldehyde. With stirring, the reaction mixture is kept for 24 hours at 20° C. Yield: 1540 parts of a 50% aqueous, slightly yellowish viscous solution of the reaction product of the formula

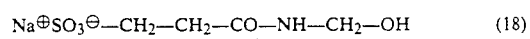

Method C

The procedure of Method A is repeated, using 378 parts (3.6 moles) of diethanolamine instead of 264.6 parts of diethylamine. Yield: 1280 parts of a 50% aqueous, slightly viscous brownish solution of the reaction product of the formula

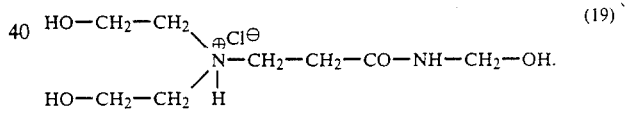

PREPARATORY EXAMPLES

Example 1

50 parts of a commercially available crosslinked dextran (SEPHADEX® G 50) are suspended in 250 parts of the 50% aqueous solution of the reaction product of Method A, which has been adjusted beforehand to pH 3.5 with a 1N aqueous solution of hydrochloric acid. This suspension is stirred for 30 minutes at 20° C. and then filtered.

The impregnated polysaccharide powder is dried under reduced pressure at 70° C. The condensation of the reaction product with the hydroxyl groups of the polysaccharide is then carried out for 75 minutes at 100° C. The treated polysaccharide powder is washed with deionised water until neutral, dried at 70° C. under reduced pressure, and finely ground (granular size: 50–150 μm), affording 50 parts of an ionically modified polysaccharide in the form of a white crystalline powder having a degree of substitution of 0.60, an ion exchange capacity of 2.9 meq/g, a bulk density of 2.3 ml/g, a swelling capacity in water of 435 g/l, and very good flow properties, and containing modified saccharide units of the formula

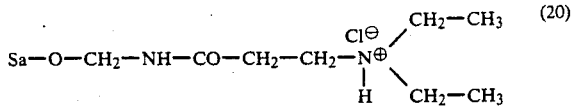

wherein Sa is a saccharide residue.

The methods of determining the ion exchange capacity are described for example on page 23 of the monograph "Cellulosic Ion Exchangers" by E. A. Peterson (1980 edition, Elsevier).

The bulk density is determined as follows: A measuring cylinder of 10 ml capacity is filled with the respective material while knocking 10 times, then the weight is determined and expressed per liter.

The swelling capacity is determined as follows: a 100 ml measuring cylinder is charged with 1 g of dry material, which is mixed with 100 ml of deionised water, and the mixture is allowed to stand for 14 hours, and then the volume of the swelled material is read off from the measuring cylinder.

Example 2

Step I 50 parts of white dextrin are suspended in 250 parts of a 60% aqueous solution of monomethylolacrylamide and 0.025 part of hydroquinone. This suspension, which has a pH of 2.5, is stirred for 30 minutes at 20° C. and then filtered. The still moist impregnated dextrin is stored for 24 hours at 20°C. and then dired at 70° C. under reduced pressure. The condensation reaction is carried out for 60 minutes at 120° C. After washing, drying and grinding as described in Example 1, there are obtained 50 parts of an acrylic-modified polysaccharide in the form of a white powder and containing modified saccharide units of the formula

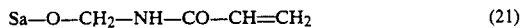

wherein Sa is a saccharide residue.

Step II 50 parts of the acrylic-modified polysaccharide obtained in step I are suspended in 300 parts of deionised water. To this suspension are added, over 20 minutes, 80 parts of a 50% aqueous solution of diethylamine. The reaction mixture exotherms to 30° C. and the pH rises to 12.3. The suspension is then heated to 50° C. and stirred for 5 hours at this temperature, during which time the pH of the suspension gradually falls to 11.8. The suspension is then filtered. The polysaccharide so treated is washed with 500 parts of an 0.1N aqueous solution of hydrochloric acid, then washed with deionised water until the pH of the filtrate is 6.0. The modified polysaccharide is dried at 80° C. under reduced pressure and ground (granular size: 50–150 μm), affording 45 parts of cationically modified polysaccharide in the form of a yellowish powder which has a degree of substitution of 0.125, an ion exchange capacity of 1.4 meq/g, a bulk density of 665 g/l, swelling capacity in water of 2.8 ml/g and very good flow properties, and which contains saccharide units of the formula (20).

Example 3

The procedure of Example 1 is repeated, using a commercially available crosslinked agarose (SEPHAROSE ® CL-6B) as starting material, to give also 45 parts of cationically modified polysaccharide containing cationic units of the formula (20) and having very good flow properties, but with a degree of substitution of 0.21, an ion exchange capacity of 0.86 meq/g, a bulk density of 625 g/l and a swelling capacity in water of 7 ml/g.

Example 4

The procedures described in steps I and II of Example 2 are repeated, but using, as starting material, white dextrin which has been treated, before use, with an aqueous solution of sodium carbonate, so that the pH of the suspension of white dextrin in the solution of monomethyloacrylamide and hydroquinone is 7.0 instead of 2.5. The yield is also 45 parts of cationically modified polysaccharide containing cationic units of the formula (20) and having the properties indicated in step II of Example 2, except that the ion exchange capacity is 1.75 meq/g.

Example 5

The procedure of step II of Example 2 is repeated, using 112 parts of a 50% aqueous solution of sodium pyrosulfite (instead of 80 parts of the 50% aqueous solution of diethylamine) made alkaline with sodium hydroxide. The pH of the suspension is adjusted to 12.5 by addition of a 2N aqueous solution of sodium hydroxide. The suspension is heated to 50° C. and stirred for 5 hours at this temperature. The suspension is then filtered. The polysaccharide is washed as described in step II of Example 2 and dried, affording 70 parts of an anionically modified polysaccharide in the form of a white powder having a degree of substitution of 0.3, an ion exchange capacity of 2.9 meq/g, a bulk density of 670 g/l, a swelling capacity in water of 3.5 ml/g and very good flow properties, and which contains modified saccharide units of the formula

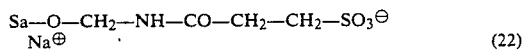

wherein Sa is a saccharide residue.

Example 6

The procedure of Example 1 is repeated, using 250 parts of a 50% aqueous solution of the reaction product of Method B (instead of that of A) and additionally storing the still moist impregnated polysaccharide powder (after filtering the suspension) for 24 hours at 20° C. The condensation reaction and the working up of the treated polysaccharide powder (washing, drying, grinding) are also carried out as described in Example 1, affording 65 parts of an anionically modified polysaccharide having a degree of substitution of 0.35, an ion exchange capacity of 2.0 meq/g, a bulk density of 430 g/l, a swelling capacity in water of 38 ml/g and very good flow properties, and which contains modified saccharide units of the formula (22).

Example 7

20 parts of a commercially available crosslinked agarose (SEPHAROSE ® CL-B) are suspended in 100 parts of a 50% aqueous solution of the reaction product of Method B which has been adjusted beforehand to pH 3.5 with a 1N aqueous solution of hydrochloric acid. This suspension is stirred for 30 minutes at 20° C. and then filtered. The still moist impregnated polysaccharide powder is stored for 24 hours at 20° C. The subsequent drying and the condensation reaction as well as the working up of the treated polysaccharide powder (washing, drying, grinding) are carried out as described in Example 1, affording 20 parts of an anionically modified polysaccharide in the form of a yellowish powder having a degree of substitution of 0.30, an ion exchange capacity of 1.7 meq/g, a bulk density of 625 g/l, a swelling capacity in water of 7 ml/g and very good flow properties, and which contains modified saccharide units of the formula (22).

Example 8

The procedure of Example 7 is repeated, using 100 parts of a 50% aqueous solution of the reaction product of Method C (instead of that of Method B). After washing, drying and grinding, there are obtained 19 parts of a cationically modified polysaccharide in the form of a yellowish powder having a degree of substitution of 0.35, an ion exchange capacity of 1.4 meq/g, a bulk density of 625 g/l, a swelling capacity in water of 6 ml/g and very good flow properties, and which contains modified saccharide units of the formula (23)

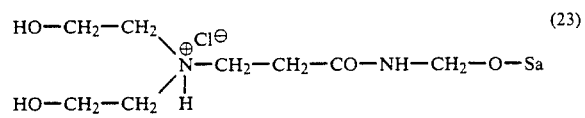

wherein Sa is a saccharide residue.

Example 9

20 parts of a commercially available crosslinked dextran (SEPHADEX ® G-50) are suspended in 100 parts of a 50% aqueous solution of dimethylphosphono-N-hydroxymethylpropionamide, which has been adjusted beforehand to pH 3.5 with a 1N aqueous solution of hydrochloric acid. The procedure of Example 1 is then carried out affording, after washing, drying and grinding, 18 parts of a modified polysaccharide in the form of a white powder having a degree of substitution of 0.20. The resultant phosphoric ester of the polysaccharide is then suspended in 50 parts of a 2N aqueous solution of sodium hydroxide. This suspension is heated to reflux temperature of about 100° C. and stirred for 1 hour at this temperature. The suspension is then cooled to 20° C., filtered, and the filter cake is dried at 70° C. under reduced pressure, affording 17 parts of an anionically modified polysaccharide having an ion exchange capacity of 0.43 meq/g, a bulk density of 625 g/l, a swelling capacity in water of 5 ml/g and very good flow properties, and which contains modified saccharide units of the formula (24)

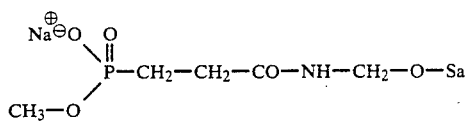

wherein Sa is a saccharide residue.

Example 10

The procedure of Example 2 is repeated, using in step II a commercially available uncrosslinked dextran (instead of white dextran) and carrying out the reaction with the diethylamine solution in step II at 50° C. for 20 minutes (instead of 5 hours). After filtering the suspension, the treated polysaccharide is dried at 100° C. under reduced pressure, washed with 250 parts of alcohol, then separated from the alcohol by decantation, and dried and ground as described in step I of Example 2, affording 40 parts of cationically modified polysaccharide in the form of a slightly yellowish powder having a degree of substitution of 0.35, an ion exchange capacity of 1.6 meq/g, a bulk density of 600 g/l, a swelling capacity in water of 5 ml/g and very good flow properties, and which contains modified saccharide units of the formula (20).

APPLICATION EXAMPLES

Example 11

6 parts of the modified polysaccharide of Example 2 (step II) are suspended in 50 parts of distilled water and the suspension is stirred for 30 minutes at 20° C. The pH of the suspension is 6.0. The suspension is then introduced into a glass chromatography column (diameter 1.27 cm, length 33 cm). The homogeneous bed of cellulose material, as the stationary phase, has a volume of 40 ml (filled height 31.5 cm). The cellulose material is first washed for one hour with distilled water at a flow rate of 700 ml·hr$^{-1}$·cm$^{-2}$ (counter-pressure of the column 2 to 3 bar), then activated with a 0.1N aqueous solution of hydrochloric acid, and subsequently washed with water until neutral. The column is then charged with 5 ml of a 0.5% aqueous solution of a commercially available lignosulfonate mixture obtained from pulping and which has a pH of 10.0. All the components of the lignosulfonate mixture are retained on the modified polysaccharide at a flow rate of 100 ml·hr$^{-1}$·cm$^{-2}$.

The components of the lignosulfonate mixture are then separated by chromatography from the modified polysaccharide, as the stationary phase, using several eluants having an increasing concentration of electrolyte as the mobile phase. A fraction collector, which separates the eluate into 4 ml fractions, is used for this purpose, the flow rate of the liquid phase through the stationary phase being 100 ml·hr$^{-1}$·cm$^{-2}$. The absorption of each of the 4 ml fractions at 250 nm is determined, in order to make it possible to compare concentrations in respect of components of the lignosulfonate mixture. The fractions which have no absorption are discarded. The fractions exhibiting absorption are collected. 5 components of the lignosulfonate mixture are thus eluted in the course of the separation process. The course of the chromatographic separation of the lignosulfonate mixture by means of the eluants used is indicated in Table I below:

TABLE I

| Eluants (aqueous solutions), pH | ml of eluate | Serial No. of the 4 ml fractions | Components eluted | | |
|---|---|---|---|---|---|
| | | | No. | Volume, ml | % of the mixture |
| NaCl 0.17 N pH 7.0 | 80 | 1–20 | — | — | — |
| NaCl 1 N pH 7.0 | 88 | 21–22 | — | — | — |
| | 108 | 23–27 | I | 20 | 0.9 |
| | 160 | 28–40 | — | — | — |
| NaCl 2 N pH 7.0 | 168 | 41–42 | — | — | — |
| | 184 | 43–46 | II | 16 | 1.8 |
| | 200 | 47–50 | — | — | — |
| 10% tris-(hydroxymethyl)-aminomethane buffer in distilled H$_2$O, pH 10.5 | 228 | 51–57 | — | — | — |
| | 272 | 58–68 | III | 44 | 13.5 |
| | 280 | 69–70 | — | — | — |

TABLE I-continued

| Eluants (aqueous solutions), pH | ml of eluate | Serial No. of the 4 ml fractions | Components eluted No. | Volume, ml | % of the mixture |
|---|---|---|---|---|---|
| 0.4% ige NH$_3$-solution pH 11.2 | 288 324 360 | 71–72 73–81 82–90 | — IV — | — 36 — | — 28.8 — |
| 7.5% ige NH$_3$-solution pH 12.3 | 368 408 440 | 91–92 93–102 103–110 | — V — | — 40 — | — 54.9 — |

In the IR spectrum, the weakly polar component I (0.9% of the original lignosulfonate mixture) has the characteristic —C=O band; component II (1.8% of the mixture) has the characteristic —COO$^\ominus$ band in addition to phenolic groups, and component III (13.5% of the mixture) has the characteristic polar SO$_3^\ominus$ and SO$_3$Na bands. On the basis of its chromatographic behaviour, corresponding to the higher pH values of the mobile phase, component IV (28.8% of the mixture) is a polar lignosulfonate fraction, and component V (54.9% of the mixture) is a very polar, highly sulfonated lignin fraction.

When the separation of the lignosulfonate mixture has been concluded, using a total of 440 ml of eluant, the modified polysaccharide in the chromatography column is washed with about 100 ml of aqueous 0.1N hydrochloric acid solution until the eluate has a pH 1 to 2. The modified polysaccharide is washed with about 100 ml of aqueous 0.5N solution of sodium chloride (until the eluate has a pH of 5.5), and is then available as a regenerated, stationary phase for further chromatographic separations.

Similar results are also obtained if the cationically modified polysaccharide according to one any of Examples 1, 3 or 4 is employed as the stationary phase.

Example 12

Following the procedure of Example 11, 7 parts (instead of 6 parts) of the modified polysaccharide obtained in Example 2 (step II) are suspended in 70 parts (instead of 50 parts) of distilled water, to give a homogeneous bed of the stationary phase in the chromatography column which has a volume of 20 ml (instead of 16.5 ml) and a filled height of 16.5 cm (instead of 12 cm). A commercially available weakly sulfonated (instead of strongly sulfonated) lignosulfonate mixture is charged to the column and 4 components (instead of 5 components) of the lignosulfonate mixture are eluted with the eluants listed in Table II using a fraction collector that separates 5 ml (instead of 4 ml) eluate fractions. Table II indicates the course of the chromatographic separation:

TABLE II

| Eluants (aqueous solutions), pH | ml of eluate | Serial No. of the 4 ml fractions | Components eluted No. | Volume, ml | % of the mixture |
|---|---|---|---|---|---|
| 10% tris-(hydroxy-methyl)-amino methane buffer in distilled H$_2$O, pH 10.5 | 20 30 50 | 1–4 5–6 7–10 | — I — | — 10 — | — 7 — |
| 0.4% NH$_3$ solution pH 11.2 | 70 100 150 | 11–14 15–20 21–30 | — II — | — 30 — | — 54 — |
| 7.2% NH$_3$ solution pH 12.3 | 170 200 250 | 31–34 35–40 41–50 | III — — | 30 — — | 23 — — |
| 0.1 N NaOH solution pH 14 | 270 300 350 | 51–54 55–60 61–70 | IV — — | 30 — — | 16 — — |

*contained in the mixture of the dye components

Example 13

Following the procedure of Example 11, 6 parts of the modified polysaccharide obtained in Example 8 (instead of 6 parts of the modified polysaccharide obtained in step II of Example 2) are suspended in 70 parts (instead of 50 parts) of distilled water, to give a homogeneous bed of the stationary phase in the chromatography column which has a volume of 34 ml (instead of 16.5 ml) and a filled height of 26.5 cm (instead of 13 cm), and 6 components (instead of 5 components) of the lignosulfonate mixture are eluted with the eluants listed in Table III using a fraction collector that separates 5 ml (instead of 4 ml) eluate fractions. Table III indicates the course of the chromatographic separation:

TABLE III

| Eluants (aqueous solutions), pH | ml of eluate | Serial No. of the 4 ml fractions | Components eluted No. | Volume, ml | % of the mixture |
|---|---|---|---|---|---|
| NaCl 0.17 N pH 7.0 | 20 30 50 | 1–4 5–6 7–10 | — I — | — 10 — | — 6 — |
| NaCl 1 N pH 7.0 | 70 100 150 | 11–14 15–20 21–30 | — II — | — 30 — | — 13 — |
| buffer solution pH 8.0 | 170 200 230 | 31–34 35–40 41–50 | — III — | — 30 — | — 4 — |
| buffer solution pH 9.0 | 270 300 350 | 51–54 55–60 61–70 | — IV — | — 30 — | — 12 — |
| buffer solution pH 10.0 | 370 400 450 | 71–74 75–80 81–90 | — V — | — 30 — | — 35 — |
| 10% tris-(hydroxy-methyl)-aminomethane buffer in distilled H$_2$O, pH 10.5 | 470 500 550 | 91–94 95–100 101–110 | — VI — | — 30 — | — 30 — |

Example 14

7 g of the modified polysaccharide obtained in Example 5 are suspended in 70 ml of distilled water and the suspension is stirred for 30 minutes at 20° C. The pH of the suspension is 8.0. The suspension is then introduced into a glass chromatography column (diameter 1.27 cm, length 33 cm). The homogeneous bed of the modified polysaccharide, as the stationary phase, has a volume of 24.5 ml (filled height 20 cm). The modified polysaccharide is first washed for 1 hour with distilled water at a flow rate of 700 ml·hr$^{-1}$·cm$^{-2}$ (counter-pressure of the column 2 to 3 bar), then activated with a 5% aqueous solution of sodium carbonate and subsequently washed with water until neutral. The column is then charged with 5 parts of a 0.5% aqueous solution of a commercial lignoamine mixture obtained from pulping and the pH of which is 6.0. All components of the lignoamine mixture are adsorbed on the modified polysaccharide at a rate of flow of 100 ml·h$^{-1}$·cm$^{-2}$. The components of the lignoamine mixture are separated with several eluants (different buffer solutions with increasing pH values) as mobile phases from the modified polysaccharide as stationary phase. This is done by collecting 5 ml fractions of the corresponding eluates of the buffer solutions by means of a fraction collector and measuring the spectral absorption of the respective fraction at 250 nm in order to be able to compare the concentrations of the components of the lignoamine mixture. Accordingly, 4 components of the lignoamine are eluted in the course of the separation procedure. Table IV indicates the course of the chromatographic separation of the lignin mixture.

TABLE IV

| Eluants (aqueous solutions), pH | ml of eluate | Serial No. of the 4 ml fractions | Components eluted | | |
|---|---|---|---|---|---|
| | | | No. | Volume, ml | % of the mixture |
| 7.0 (distilled water) | 100 | 1–10 | — | — | — |
| 8.0 (buffer solution) | 200 | 11–20 | I | 100 | 23 |
| 8.5 (buffer solution) | 300 | 21–30 | — | — | — |
| 9.0 (buffer solution) | 400 | 31–40 | — | — | — |
| 10.0 (buffer solution) | 500 | 41–50 | — | — | — |
| 11.0 (buffer solution) | 600 | 51–60 | II | 100 | 31 |
| 12.0 (buffer solution) | 700 | 61–70 | III | 100 | 28 |
| 13.0 (buffer solution) | 800 | 71–80 | IV | 100 | 18 |

Similar results of the chromatographic separation of the components of the lignoamine are also obtained by using the anionic modified polysacharide of Example 6, 7 or 9 as stationary phase.

Example 15

The procedure of Example 14 is repeated, using 1 part of the modified polysaccharide obtained in Example 6 (instead of Example 5), to give a homogeneous bed of the stationary phase which has a volume of 36 ml (instead of 24.5 ml) and a filled height of 28.5 cm (instead of 20 cm). After rinsing, activating and washing the stationary phase, the column is charged with a mixture of dyes comprising 50% of C.I. Basic Blue 3, 25% of C.I. Basic Yellow 45 and 25% of C.I. Basic Red 14. The individual dyes of the mixture are completely retained on the modified polysaccharide at a rate of flow of 100 ml·h$^{-1}$·cm$^{-2}$.

The individual dyes of the mixture are then separated by chromatography with a buffer solution of pH 4.0, as mobile phase, from the modified polysaccharide as stationary phase. This is done by collecting 5 ml fractions of the respective eluates and then determining the absorption of the fractions (at the respective maximum absorption values of the different dyes) in order to be able to compare the concentrations of the components of the dye mixture. Accordingly, 4 components are eluted in the course of the separation procedure. Table V indicates the course of the chromatographic separation of the dye mixture.

TABLE V

| pH of the buffer solution used as eluant | ml of eluate | Serial No. of the 5 ml fractions | eluted dye components | | | |
|---|---|---|---|---|---|---|
| | | | No. | Volume ml | | %* |
| 4.0 | 25 | 1–5 | I | 25 | red | 6% |
| | | | | | blue | 6% |
| 4.0 | 50 | 6–10 | II | 25 | red | 18% |
| | | | | | blue | 19% |
| 4.0 | 75 | 11–15 | III | 25 | red | 1% |
| | | | | | blue | 25% |
| 4.0 | 100 | 16–20 | IV | 25 | yellow | 25% |

*of the dye components contained in the mixture

Example 16

The procedure of Example 14 is repeated, using 5 parts of the modified polysacharide obtained in Example 7 (instead of Example 5), to give a homogeneous bed of the stationary phase which has a volume of 33.5 ml (instead of 24.5 ml) and a filled height of 26.5 cm (instead of 20 cm). After rinsing, activating and washing the stationary phase, the column is charged with a mixture of dyes comprising 33% of C.I. Basic Blue, 33% of C.I. Basic Red 14 and 34% of C.I. Basic Yellow 45. Chromatographic separation of the mixture is performed as described in Example 15, but separating 3 (instead of 4) fractions of the dye mixture and using a buffer solution of pH 4.5 (instead of 4.6). Table VI indicates the course of the chromatographic separation of the dye mixture.

TABLE VI

| pH of the buffer solution used as eluant | ml of eluate | Serial No. of the 5 ml fractions | eluted dye components | | | |
|---|---|---|---|---|---|---|
| | | | No. | Volume ml | | %* |
| 4.5 | 100 | 1–20 | — | — | | — |
| 4.5 | 200 | 21–40 | I | 100 | blue | 33% |
| 4.5 | 300 | 41–60 | II | 100 | red | 33% |
| 4.5 | 400 | 61–80 | III | 100 | yellow | 34% |
| 4.5 | 500 | 81–100 | — | — | | — |

*of the dye component contained in the mixture

Example 17

The procedure of Example 14 is repeated, using 7 parts of the modified polysaccharide obtained in Example 9 (instead of Example 5), to give a homogeneous bed of the stationary phase which has a volume of 35 ml (instead of 24.5 ml) and a filled height of 28.5 cm (instead of 20 cm). After rinsing, activating and washing the stationary phase as described in Example 14, the column is charged with a mixture of dyes comprising 25% of C.I. Basic Yellow 45 and 75% of C.I. Basic Red 14. Chromatographic separation of the mixture is performed as described in Example 15, but separating 5 (instead of 4) fractions of the dye mixture and using 3 buffer solutions of pH 6, 4 and 2 (instead of a buffer solution of pH 4.6). Table VII indicates the course of the chromatographic separation of the dye mixture.

TABLE VII

| pH of the buffer solution used as eluant | ml of eluate | Serial No. of the 5 ml fractions | eluted dye components | | | |
|---|---|---|---|---|---|---|
| | | | No. | Volume ml | | %* |
| 6.0 | 120 | 1–24 | I | 120 | red | 25% |

TABLE VII-continued

| pH of the buffer solution used as eluant | ml of eluate | Serial No. of the 5 ml fractions | eluted dye components | | | |
|---|---|---|---|---|---|---|
| | | | No. | Volume ml | | %* |
| 6.0 | 170 | 25–34 | II | 50 | red | 25% |
| 4.0 | 220 | 35–44 | III | 50 | red | 14% |
| 2.0 | 290 | 45–58 | IV | 70 | red yellow | 10% 12% |
| 2.0 | 390 | 59–78 | V | 100 | red yellow | 1% 13% |

*of the components contained in the mixture

Example 18

A chromatography column with a diameter of 1.27 cm is charged with 7 parts of the cationically modified polysaccharide obtained in Example 8 (corresponding to 42 ml of modified polysaccharide and a filled height of 33 cm). Then 250 ml of a 1.42% aqueous solution of crude cephalosporin C sodium salt, are percolated through the column at a rate of flow of 50 ml·h$^{-1}$·cm$^{-2}$ at 0.01 bar. The absorption of the strongly brownish solution, measured at 425 nm in a 1 cm cell, is 1.65 before percolation, whereas the percolate has an absorption of only 0.935. The yield of percolated purified cephalosporin C sodium salt, based on crude sodium salt, is 95.5%.

Similar results are obtained by using the modified polysaccharide obtained in any one of Examples 1, 2 (step II), 3, 8 or 10, instead of the modified polysaccharide of Example 8.

Example 19

5 g of the cationically modified polysaccharide obtained in Example 8 are suspended in 60 ml of distilled water, an the suspension is stirred at 20° C. for 30 minutes. The pH of the suspension is 6.0. The suspension is then introduced into a glass chromatography column (diameter 1.3 cm, length 30 cm). The homogeneous bed of cellulose material has a volume of 29 ml (filled height 22 cm). The resulting column has a flow rate of 720 ml·hr$^{-1}$·cm$^{-2}$ at a counter-pressure of 1.5 bar. The column is activated as indicated in Example 11 and is then washed.

The column is then charged with an aqueous solution containing 1% of a humic acid. The humic acid employed has a molecular weight of 600 to 1000 and an ash content of 10 to 15% (supplier FLUKA, catalogue No. 53,680, 1984 edition). The humic acid solution is pumped through the column until the presence of humic acid is detected at the outlet from the column by means of a UV detector (determination carried out at 240 nm).

The separation of the humic acid is carried out by elution with an aqueous ammonia solution having a pH of 12.3.

The elution process is continued until the UV detector indicates the absence of humic acid at the outlet of the column.

The loading capacity of the cationically modified polysaccharide can be calculated on the basis of the content of humic acid before and after flow through the column. It is 50 mg of humic acid per g of separating material.

The column is regenerated by rewashing with distilled water until the pH of the wash water is 7 to 8, and is then washed with aqueous 0.1N hydrochloric acid solution until the pH of the eluate is 1 to 2. The column is then washed once more with 50 ml of distilled water.

After regeneration, the column is charged again, as indicated above, with the aqueous 1% solution of humic acid.

After one regeneration step, the loading capacity is 40 mg of humic acid per g of separating material.

The regeneration step and the separation of the humic acid solution are repeated once more.

After two regeneration stages, the loading capacity is then 37 mg of humic acid per g of separating material.

Example 20

The procedure described in Example 19 is repeated, except that the cationically modified polysaccharide of Example 2 is used as the separating material.

The loading capacity is 36 mg of humic acid per g of separating material, and is 30 mg after one regeneration step.

Similar results are obtained by using the cationically modified polysaccharide of Example 3, 4, 8, or 10.

Example 21

85 mg of the humic acid employed in Example 20 are dissolved in 500 ml of distilled water. 1 g of the cationically modified polysaccharide obtained in Example 1 is added, with stirring, to the humic acid solution. The mixture is stirred at 20° C. for 20 minutes. After the mixture has been allowed to stand, the humic acid still present in the solution can be determined by measuring the UV-absorption at 250 nm, and the amount of humic acid which has been removed from the solution by the modified polysaccharide can be calculated.

In the above batchwise operation, 42 mg of humic acid per g of modified polysaccharide can be removed from an aqueous solution.

Example 22

Following the procedure of 21, the batch (humic acid solution and cationically modified polysaccharide) is stirred for 20 minutes at 40° C. The amount of humic acid retained is 57 mg per g of modified polysaccharide.

What is claimed is:

1. An uncrosslinked or crosslinked agarose which contains basic radicals of the formula $$\begin{array}{c} R_1 \\ \diagdown \\ R_2 \diagup \end{array} N^{\oplus} - Q_1 \left[ \begin{array}{c} H \\ | \\ N^{\oplus} - Q_2 \\ | \\ R_4 \end{array} \right]_{n-1} CO-NH-CH_2-O-.$$

wherein n is 1 or 2, each of $R_1$, $R_2$, $R_3$ and $R_4$ independently is hydrogen, $C_1$–$C_4$alkyl which is unsubstituted or substituted by hydroxy, nitrile, halogen or $C_1$–$C_4$alkoxy, cyclopentyl or cyclohexyl or $C_1$–$C_4$alkyl-substituted cyclopentyl or cyclohexyl, benzyl or phenyl, each unsubstituted or substituted by nitro or halogen, or $R_1$ and $R_2$, together with the nitrogen atom to which they are attached form a 5- or 6-membered heterocyclic ring, or $R_3$ and $R_3$, together with the grouping $$\diagdown N - Q_1 - N \diagup$$

to which they are attached also form a 5- or 6-membered heterocyclic ring, and each of $Q_1$ and $Q_2$ independently is $C_1$-$C_8$alkylene, or zwitterionic radicals of the formula

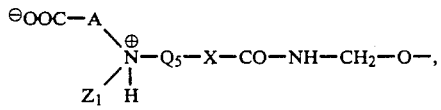

wherein X is —O—, —S—,

or a direct bond, $R_{11}$ is hydrogen or $C_1$-$C_4$alkyl, $Q_5$ is a $C_1$-$C_8$alkylene or phenylene radical, each of which is unsubstituted or substituted by $C_1$-$C_4$alkyl or phenyl, $Z_1$ is —B—COO$^\ominus$, $C_1$-$C_4$alkyl or hydrogen, and A and B are each independently of the other $C_1$-$C_8$alkylene which is unsubstituted or substituted by $C_1$-$C_4$alkyl, $C_1$-$C_4$alkoxy or phenyl, or acid radicals of the formula

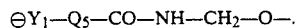

wherein $Y_1^\ominus$ is —COO$^\ominus$, —SO$_3^\ominus$ or —P(OR$_{11}$)O$_2^\ominus$, $R_{11}$ is hydrogen and $Q_5$ is a $C_1$-$C_8$alkylene or phenylene radical, each of which is unsubstituted or substituted by $C_1$-$C_4$alkyl or phenyl, which radicals are attached to said agarose through the ether oxygen of the —CO—NH—CH$_2$—O— group of said radicals.

2. An agarose according to claim 1, which contains basic radicals of the formula

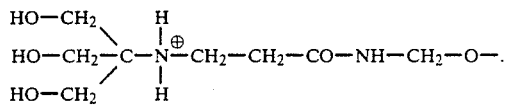

3. An agarose according to claim 1, which contains basic radicals of the formula

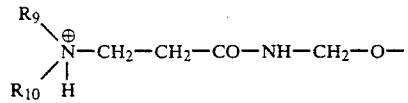

wherein each of $R_9$ and $R_{10}$ is isopropyl, n-propyl, ethyl or methyl.

4. An agarose according to claim 1, which contains zwitterionic radicals of the formula

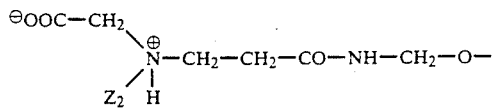

wherein $Z_2$ is methyl or hydrogen.

5. An agarose according to claim 1, which contains acid radicals of the formula

wherein $Q_6$ is isopropylene, n-propylene, ethylene or methylene, and $Y_2^\ominus$ is —COO$^\ominus$, —SO$_3^\ominus$, or

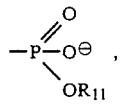

and $R_{11}$ is hydrogen or $C_1$-$C_4$alkyl.

6. An agarose according to claim 1, which has a degree of substitution of 0.1 to 0.8.

7. An agarose according to claim 1, which contains basic radicals of the formula

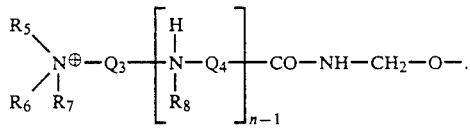

wherein n is 1 or 2, each of $R_5$, $R_6$, $R_7$ and $R_8$ independently is hydrogen, $C_1$-$C_4$alkyl or $C_1$-$C_4$alkyl which is substituted by hydroxy, nitrile or chloro, or cyclopentyl or cyclohexyl, each unsubstituted or substituted by $C_1$-$C_4$alkyl, or is chlorobenzyl, benzyl, chlorophenyl, nitrophenyl or phenyl, or $R_5$ and $R_6$, together with the nitrogen atom to which they are attached form a pyrrolidinium or piperidinium ring, or together with the nitrogen atom to which they are attached and an oxygen atom, form a morpholinium ring, or $R_7$ and $R_8$, together with the grouping

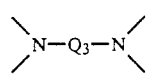

to which they are attached, form an imidazolinium, benzimidazolinium, piperazinium or triazinium ring, or a mono- or dichlorotriazinium ring, and each of $Q_3$ and $Q_4$ independently of the other is $C_2$-$C_3$alkylene.

* * * * *